March 14, 1967
L. FREIMARK
3,308,545
GAGEPLUGS FOR MEASURING THE CENTER
DISTANCE BETWEEN TAPPED HOLES
Filed June 23, 1964
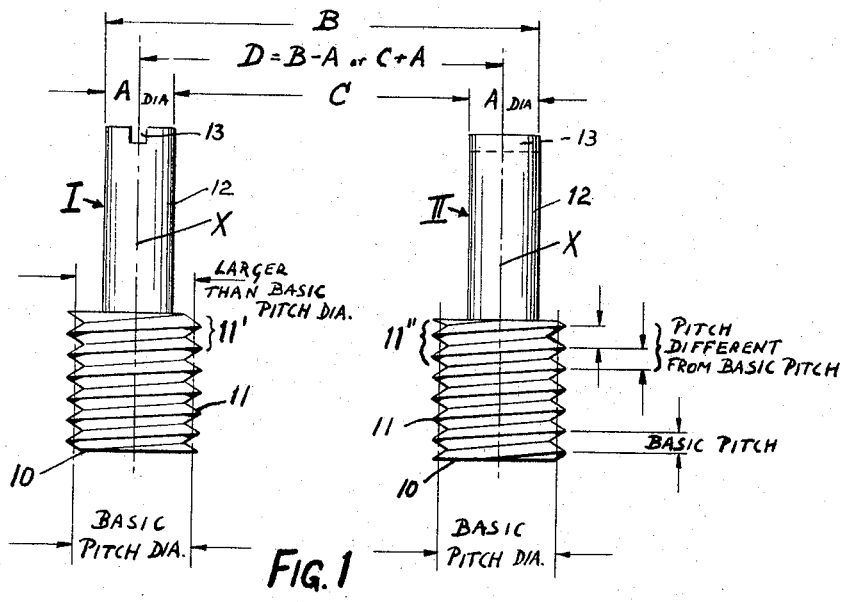
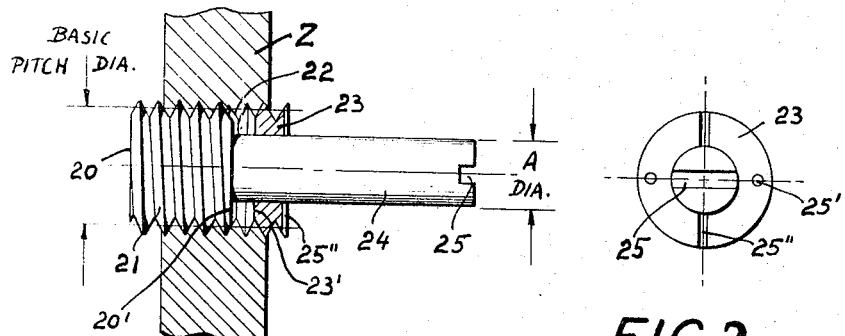
FIG.2　　FIG.2 a
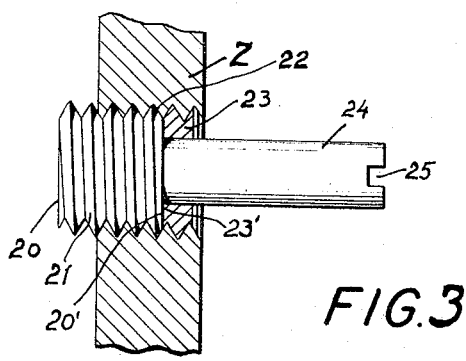
FIG.3
Leopold Freimark
INVENTOR
BY Paul F. Boehm
Reg. Pat. Agent

United States Patent Office 3,308,545
Patented Mar. 14, 1967

3,308,545
GAGEPLUGS FOR MEASURING THE CENTER
DISTANCE BETWEEN TAPPED HOLES
Leopold Freimark, 45—48 169th St.,
Flushing, N.Y. 11358
Filed June 23, 1964, Ser. No. 377,269
3 Claims. (Cl. 33—174)

The present invention concerns gageplugs for measuring the center distance between tapped holes and for checking whether the axes of such holes are parallel with each other and/or are oriented at a desired angle, preferably at 90°, relative to a reference surface, particularly the surface from which the tapped holes extend into the material.

According to known methods of determining the center distance between threaded holes either the distance between the centers of the holes is measured before they are tapped, or taps, screws or thread gages are inserted into the tapped holes whereafter the distance between the centers of the holes is measured by means of micrometers, calipers, snapgages, size blocks or other measuring devices which are applied to the shanks of the inserted members.

However, the threads of the inserted taps, screws or gages are normally smaller in diameter than the tapped holes and the ensuing play in the threads renders accurate measuring practically impossible.

One way to eliminate the play in the course of the measuring operation is pushing the threaded inserts after their insertion away from each other and measuring the distance while in this manner the play has been excluded, and then taking another measurement after having pushed the threaded inserts toward each other for the same purpose. The mean value of the two measurements will represent the approximate distance between corresponding points of the inserts and the approximate center distance can be derived therefrom in a well-known manner.

It is clear that this method is unreliable, cumbersome and entails the possibility of unpredictable errors because both inserts are bound to be inclined with respect to the axis of the respective tapped hole so that measurements taken at different heights above the surface from which the insert shanks project will yield unrelated results.

When the same means as described above are used for determining whether the axes of tapped holes are oriented at a desired angle, e.g. 90°, with respect to the reference surface, the same difficulties arise as those referred to above.

It will be understood therefore that only by elimination of the play between the thread of an individual gaging element and the thread of the hole to be checked can accurate measurements be obtained.

It is therefore an object of this invention to provide for gaging tools which meet the above condition and thus make it possible to measure accurately the center distance between threaded holes.

It is another object of the invention to provide for tools of the type set forth which are also useful for checking the orientation of the axis of a tapped hole relative to a reference surface or to the axis of another tapped hole.

It is still another object of the invention to provide for threaded gage plugs to be used as gaging tools as stated above and being of comparatively simple construction and very convenient in practice.

Still another object of the invention is to provide for thread plugs as set forth, one type of which may be used preferably for threaded holes of small diameter, and another type of which may be used particularly for comparatively large diameter holes.

With above objects in view the invention includes a threaded gage plug adapted to be used in cooperation with another gage plug of the same type for measuring the center distance between two threaded holes and for checking the orientation of the axis of a threaded hole relative to a reference surface, comprising, in combination, a body portion which has two ends and an axis, with an outer thread concentric with said axis and starting at one of said ends, said outer thread matching the inner thread of the hole to be gaged and having a pitch diameter substantially identical with that of said inner thread. From the other end of said body portion extends a shank portion of predetermined diameter and concentric with the axis of the body portion. Additionally means are provided for causing pressure engagement between said inner thread of the threaded hole to be gaged and at least a portion of said outer thread of the body portion when the latter is screwed into said hole to be gaged.

The invention and the best way of employing it will be best understood from a description of several embodiments in reference to the accompanying drawing which illustrates such embodiments only by way of example and in which:

FIG. 1 is an elevation of two threaded gage plugs according to the invention and in positions relative to each other which they would occupy when threaded into two threaded holes in a piece of material not shown, these plugs differing from each other in one respect, but both being of a type suitable for gaging comparatively small thread size.

FIG. 2 is a partly sectional elevation of another embodiment of the invention suitable for gaging larger size tapped holes.

FIG. 2a is an end view of the plug according to FIG. 2.

FIG. 3 corresponds to FIG. 2 but shows the cooperating elements in a different position.

The gage plugs I and II of FIG. 1 have each a body portion 10 that has an axis X and is provided with an outer thread 11 which has to match the thread of the threaded hole to be gaged. Normally the pitch diameter of the thread 11 will be the so-called basic pitch diameter of the respective standard thread and substantially identical with that of the inner thread of the hole to be gaged.

The lower end of the gage plugs may have any desired shape, normally a flat surface, since it does not play any role in the measuring procedure. However, from the upper end of the gage plug body 10 extends a preferably cylindrical shank 12 of predetermined diameter A and coaxial with axis X. The free end of the shank 12 may be provided with a slot 13 or other means facilitating the procedure of screwing the plug into and out of a threaded hole.

It is well known that when two plugs I and II are positioned as shown the center distance thereof i.e. the distance between the axes X can be measured by measuring either the distance C between the sides of the shanks facing towards each other and adding thereto the known diameter A of the shank, preferably measured for maximum accuracy at the same level at which the distance C is measured, or by measuring the distance B between the sides of the shanks 12 facing away from each other and deducting therefrom the known diameter A of the shanks. Evidently, in case the two taped holes the center distance whereof is to be gaged are of different size so that plugs with different thread size must be used, and in case under these circumstances or for any other reason the diameters of the shanks should differ then of course in the above calculation not the standard diameter A is to be added or deducted but the sum of the different radii of the two different shanks.

Both plugs I and II are provided with means for causing pressure engagement between the inner thread of the hole to be gaged and at least a portion of the outer thread. In the case of plug I this is achieved by providing for the last few threads near the upper end of the body portion 10 a pitch diameter slightly larger than the pitch diameter of the remainder of the thread 11, e.g. with the no-go pitch diameter as against the basic pitch diameter of the particular standard thread 11. Consequently, when the plug I is screwed into a tapped hole of the respective thread size a condition will be reached in which the oversize last threads or at least one thereof will engage one or more of the threads of the tapped hole with pressure thus removing the play and fixing the plug in an orientation in which the axis X of the plug is concentric and codirectional with the axis of the hole.

The plug II differs from plug I in that the thread 11 has the same pitch diameter throughout but the last few threads near the upper end of body portion 10 are cut with a slightly abnormal pitch, either larger or smaller than normal. Consequently, when upon screwing the plug II into the hole to be gaged the last threads 11' or at least one of them cut with abnormal pitch reach the threads of the hole cut with normal pitch the same effect of pressure engagement will be achieved as was described in reference to plug I.

It can be seen from the above that it is not even necessary that the two plugs which are inserted in two threaded holes the center distance of which is to be measured are of the same type since one may be of the type of plug I and the other of the type of plug II. Of course, it will be most convenient to use whenever possible two plugs of identical type and above all of identical shank diameters A.

After two plugs as for instance plugs I and II in FIG. 1 have been fixed without play in two threaded holes as described above the center distance D therebetween can be measured in the manner described above. As a rule, the axes X of the tapped holes are intended to be perpendicular with respect to a reference surface, preferably the surface of the material into which the holes have been drilled. In this case it will be necessary to take the measurement in a plane which is perpendicular to the axes X i.e. parallel with the reference or material surface.

In addition to determining the accurate center distance D the plugs according to the invention make it also possible to check whether the axes X of the two holes are parallel with each other or, what may be the same, whether they are perpendicular to said surface. For this purpose the shanks 12 have to have sufficient length say 1" so that a first measurement of the distance B, C or D can be taken at a level rather near the lower end of the shanks 12 and another measurement of the respective distance at a second level nearer to the upper free end of the shanks 12. Provided that the thickness of the diameter of the shanks is constant over their entire length a difference between such two measurements will show first of all that the two axes are not parallel with each other. If it is known that the axis of one of the holes is accurately perpendicular to the reference surface then such difference would indicate that the other one is not. In any case it is always possible to determine with conventional measuring tools the angle which a shank 12 or its axis encloses with the chosen reference surface.

Referring now to FIGS. 2-3 it is to be understood that the type of gageplugs illustrated by FIG. 1 are particularly well suited in dealing with holes tapped with a rather small thread size, while the gageplug type according to FIGS. 2-3 will be most suitable and convenient in dealing with larger size tapped holes and hardly practical in the case of smaller holes.

The gageplug shown in FIGS. 2-3 is composed of two members, namely a threaded body portion 20 with a shank 24 and a threaded sleeve 23 which constitutes the means for producing a pressure engagement between the thread 21 of the body portion 20 and the inner thread 22 of a tapped hole in the material Z. The thread 21 has constant pitch over its length and throughout the same pitch diameter, preferably the basic pitch diameter substantially identical with that of the inner thread 22. The shank 24 is coaxial with the body portion 20 and has a predetermined thickness or diameter which should be accurately of the magnitude A throughout. At its free end the shank 24 may be provided with suitable means for facilitating its insertion into the tapped hole, e.g. a slot 25.

The threaded sleeve 23 can be seen in plan view in FIG. 2a. It has a central bore of a diameter matching the shank diameter A so as to provide for sliding fit between these two parts, as is implied by the showing of sleeve 23 in cross section in FIG. 2. It may be provided with suitable means for screwing it into the tapped hole, e.g. with wrench holes 25' and/or slots 25", as is shown in FIG. 2. After the body portion 20 has been inserted sufficiently into the tapped hole the threads 21 being in normal engagement with the inner threads 22, the sleeve 23 is slipped forward on the shank 24 and its outer thread which is substantially identical with thread 21 is brought into engagement with the inner thread 22 of the tapped hole. This condition or positions is shown by FIG. 2. Now, while the plug is held against turning, the sleeve 23 is screwed further into the tapped hole until its forward face 23' is pressed against the opposed square shoulder 20' of the body portion 20. It is easy to understand that in this manner any previously existing play between the threads 21 and 22 is eliminated without causing the axis of the plug to get out of alignment with the axis of the tapped hole. This second position is illustrated by FIG. 3.

By using two plugs of the type of FIGS. 2-3, or one thereof in combination with one of the types according to FIG. 1, the desired measurements can be taken in exactly the same manner as described above.

Evidently threaded gageplugs according to the invention are most convenient and effective in practical use and comparatively simple to manufacture. They may be kept in stock in various standard thread sizes to be at hand whenever a need for them arises.

I do not wish to be limited to features of the above embodiments which have been described only by way of example.

What I claim is:

1. A threaded gageplug for locating the axis of internal threads of a threaded bore and for checking the orientation of the axis of internal threads in relation to their surrounding surfaces and adjacent threaded bores, comprising a circularly cylindrical body having two ends and a circularly cylindrical, coaxial shank of predetermined uniform diameter throughout its length fixed to and extending outwardly from one of said ends and being of a length to extend outwardly from the associated threaded bore when the gageplug is engaged in a threaded bore to be gaged, said body having an outer threaded portion concentric with the axis thereof and starting at the other of said ends, said outer threaded portion matching the internal screw thread of said threaded bore to be checked and having a pitch diameter substantially identical with that of said internal screw thread, said body having an inner threaded portion next to said shank portion with at least one thread of a pitch different from the pitch of the thread to be checked so that all of the flanks of the matching threads are pressed on the corresponding flanks of the internal threads to be checked when the flank of the thread having the different pitch are engaged with the corresponding flanks of the internal threads.

2. A threaded gageplug according to claim 1, wherein said threaded portion next to said shank portion has a portion of a pitch less than the pitch of the thread to be checked.

3. A threaded gageplug according to claim 1, wherein the threaded portion next to said shank portion includes a portion of a pitch greater than the pitch of the thread to be checked.

References Cited by the Examiner

UNITED STATES PATENTS

| | | | |
|---|---|---|---|
| 1,606,844 | 11/1926 | Redfield | 151—15 X |
| 2,356,098 | 8/1944 | Steinle et al. | 151—22 |
| 2,360,826 | 10/1944 | Cherry | 151—22 X |
| 2,681,821 | 6/1954 | Medders | 151—14 X |
| 2,830,635 | 4/1958 | Thorstens | 151—14 |
| 3,026,621 | 3/1962 | Papps et al. | 33—174 |

LEONARD FORMAN, *Primary Examiner.*

S. S. MATTHEWS, *Assistant Examiner.*